(12) United States Patent
Oe et al.

(10) Patent No.: US 8,742,290 B2
(45) Date of Patent: Jun. 3, 2014

(54) ROBOT SYSTEM

(75) Inventors: Yuki Oe, Fukuoka (JP); Keiji Makino, Fukuoka (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 120 days.

(21) Appl. No.: 13/369,301

(22) Filed: Feb. 9, 2012

(65) Prior Publication Data

US 2012/0255938 A1   Oct. 11, 2012

(30) Foreign Application Priority Data

Apr. 8, 2011   (JP) .................................. 2011-086135

(51) Int. Cl.
   *B23K 9/12*   (2006.01)

(52) U.S. Cl.
   USPC ............ 219/124.22; 219/121.83; 219/121.67; 219/121.63; 219/121.68; 700/166

(58) Field of Classification Search
   USPC .............. 219/121.83, 121.67, 121.63, 121.68
   See application file for complete search history.

(56) References Cited

U.S. PATENT DOCUMENTS

| | | | | |
|---|---|---|---|---|
| 4,920,249 | A * | 4/1990 | McLaughlin et al. | ... 219/130.21 |
| 5,204,814 | A * | 4/1993 | Noonan et al. | ..................... 701/25 |
| 5,233,150 | A * | 8/1993 | Schneebeli et al. | ........ 219/76.14 |
| 5,552,575 | A * | 9/1996 | Doumanidis | ............. 219/124.34 |
| 5,718,832 | A * | 2/1998 | Mori | ........................ 219/121.83 |
| 6,043,452 | A * | 3/2000 | Bestenlehrer | ............ 219/121.62 |
| 6,430,472 | B1 * | 8/2002 | Boillot et al. | ................. 700/245 |
| 6,617,544 | B1 * | 9/2003 | Tsukamoto et al. | ..... 219/121.79 |
| 6,657,156 | B2 * | 12/2003 | Kubota et al. | ............ 219/121.63 |
| 6,860,132 | B2 * | 3/2005 | Butscher et al. | ................ 72/302 |
| 6,974,930 | B2 * | 12/2005 | Jense | .......................... 219/121.8 |
| 7,248,940 | B2 * | 7/2007 | Neumann et al. | ............. 700/166 |
| 7,405,377 | B2 * | 7/2008 | James et al. | ............. 219/130.01 |
| 7,633,033 | B2 * | 12/2009 | Thomas et al. | ......... 219/121.62 |
| 7,800,014 | B2 * | 9/2010 | Thomas et al. | .......... 219/121.62 |
| 7,904,201 | B2 * | 3/2011 | Nagatsuka et al. | ........... 700/245 |
| 7,974,735 | B2 | 7/2011 | Irie et al. | |
| 8,084,708 | B2 * | 12/2011 | Andreasch et al. | ...... 219/121.62 |
| 8,103,381 | B2 | 1/2012 | Fukawa | |
| 8,168,919 | B2 * | 5/2012 | Hamaguchi et al. | ..... 219/121.63 |
| 8,198,565 | B2 * | 6/2012 | Lu et al. | ................... 219/121.63 |

(Continued)

FOREIGN PATENT DOCUMENTS

| | | |
|---|---|---|
| EP | 1769879 | 4/2007 |
| EP | 1826643 | 8/2007 |

(Continued)

OTHER PUBLICATIONS

Extended European Search Report for corresponding EP Application No. 12155125.3-1239, May 22, 2012.

(Continued)

*Primary Examiner* — Henry Yuen
*Assistant Examiner* — Jimmy Chou
(74) *Attorney, Agent, or Firm* — Ditthavong Mori & Steiner, P.C.

(57) ABSTRACT

This robot system includes a robot, a laser emitting portion moved by the robot, emitting a laser beam to a target workpiece, and a control portion controlling the laser emitting portion to emit the laser beam on the basis of information regarding an arbitrarily-shaped work locus and movement information of the laser emitting portion.

15 Claims, 11 Drawing Sheets

(56) References Cited

U.S. PATENT DOCUMENTS

| | | | |
|---|---|---|---|
| 8,428,776 B2* | 4/2013 | Letsky | 700/245 |
| 8,471,182 B2* | 6/2013 | Stauffer et al. | 219/617 |
| 8,487,209 B2* | 7/2013 | Sakamoto et al. | 219/121.63 |
| 8,536,483 B2* | 9/2013 | Thomas et al. | 219/121.68 |
| 2004/0206735 A1* | 10/2004 | Okuda et al. | 219/121.78 |
| 2005/0107919 A1* | 5/2005 | Watanabe et al. | 700/245 |
| 2005/0150876 A1* | 7/2005 | Menin et al. | 219/121.63 |
| 2005/0150878 A1* | 7/2005 | Thomas et al. | 219/121.68 |
| 2005/0258152 A1* | 11/2005 | Kawamoto et al. | 219/121.62 |
| 2005/0269302 A1* | 12/2005 | Horn | 219/121.78 |
| 2006/0060573 A1* | 3/2006 | Becker et al. | 219/121.64 |
| 2006/0175301 A1* | 8/2006 | Rippl | 219/121.8 |
| 2006/0235564 A1* | 10/2006 | Troitski | 700/166 |
| 2007/0075054 A1* | 4/2007 | Nakamura | 219/121.61 |
| 2007/0075055 A1 | 4/2007 | Komatsu | |
| 2007/0210040 A1* | 9/2007 | Sakamoto et al. | 219/121.63 |
| 2008/0006615 A1* | 1/2008 | Rosario et al. | 219/121.68 |
| 2008/0035619 A1* | 2/2008 | Hamaguchi et al. | 219/121.79 |
| 2008/0136065 A1* | 6/2008 | Ohlinger et al. | 264/482 |
| 2008/0172143 A1* | 7/2008 | Schwarz et al. | 700/166 |
| 2009/0078687 A1 | 3/2009 | Idaka et al. | |
| 2009/0230100 A1* | 9/2009 | Menin | 219/121.63 |
| 2010/0038347 A1* | 2/2010 | Schwarz et al. | 219/121.64 |
| 2010/0044357 A1* | 2/2010 | Thomas et al. | 219/121.69 |
| 2010/0155375 A1* | 6/2010 | Dietz et al. | 219/121.18 |
| 2010/0164739 A1* | 7/2010 | Heberer | 340/679 |
| 2010/0174407 A1 | 7/2010 | Fukawa | |
| 2010/0272961 A1* | 10/2010 | Costin, Jr. | 428/156 |
| 2010/0314362 A1* | 12/2010 | Albrecht | 219/121.63 |
| 2011/0139752 A1* | 6/2011 | Carter | 219/121.7 |

FOREIGN PATENT DOCUMENTS

| | | | |
|---|---|---|---|
| EP | 1826643 A1 * | 8/2007 | B25J 9/16 |
| JP | 10-071480 | 3/1998 | |
| JP | 2006-187803 | 7/2006 | |
| JP | 2007-098464 | 4/2007 | |
| JP | 2008-43971 | 2/2008 | |
| JP | 2009-078280 | 4/2009 | |

OTHER PUBLICATIONS

Japanese Office Action for corresponding JP Application No. 2011-086135, Apr. 16, 2013.

Japanese Office Action for corresponding JP Application No. 2011-086207, Apr. 16, 2013.

* cited by examiner

```
LASER WELDING CONDITION FILE  #1

INTERPOLATION   ARBITRARY SHAPE
    TYPE
   LASER      1000    W
   OUTPUT
  WELDING     500     cm/min
   SPEED
  FILE No.     1

SIZE        50     mm
```
311

ROBOT SYSTEM

CROSS-REFERENCE TO RELATED APPLICATIONS

The priority application number JP2011-086135, Robot System, Apr. 8, 2011, Yuki Oe et al., upon which this patent application is based, is hereby incorporated by reference.

BACKGROUND OF THE INVENTION

1. Field of the Invention

The present invention relates to a robot system.

2. Description of the Background Art

A robot system including a laser emitting portion capable of emitting a laser beam is known in general. Japanese Patent Laying-Open No. 2008-43971 discloses a robot system including a laser emitting apparatus (laser emitting portion) capable of emitting a laser beam to a target workpiece. This robot system is formed to emit a laser beam to an arbitrarily-shaped work locus in a state where the laser emitting apparatus is positioned (stopped) at a prescribed position.

SUMMARY OF THE INVENTION

A robot system according to an aspect of the present invention includes a robot, a laser emitting portion moved by the robot, emitting a laser beam to a target workpiece, and a control portion controlling the laser emitting portion to emit the laser beam on the basis of information regarding an arbitrarily-shaped work locus and movement information of the laser emitting portion.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention is now described with reference to the drawings.

Figure 2:
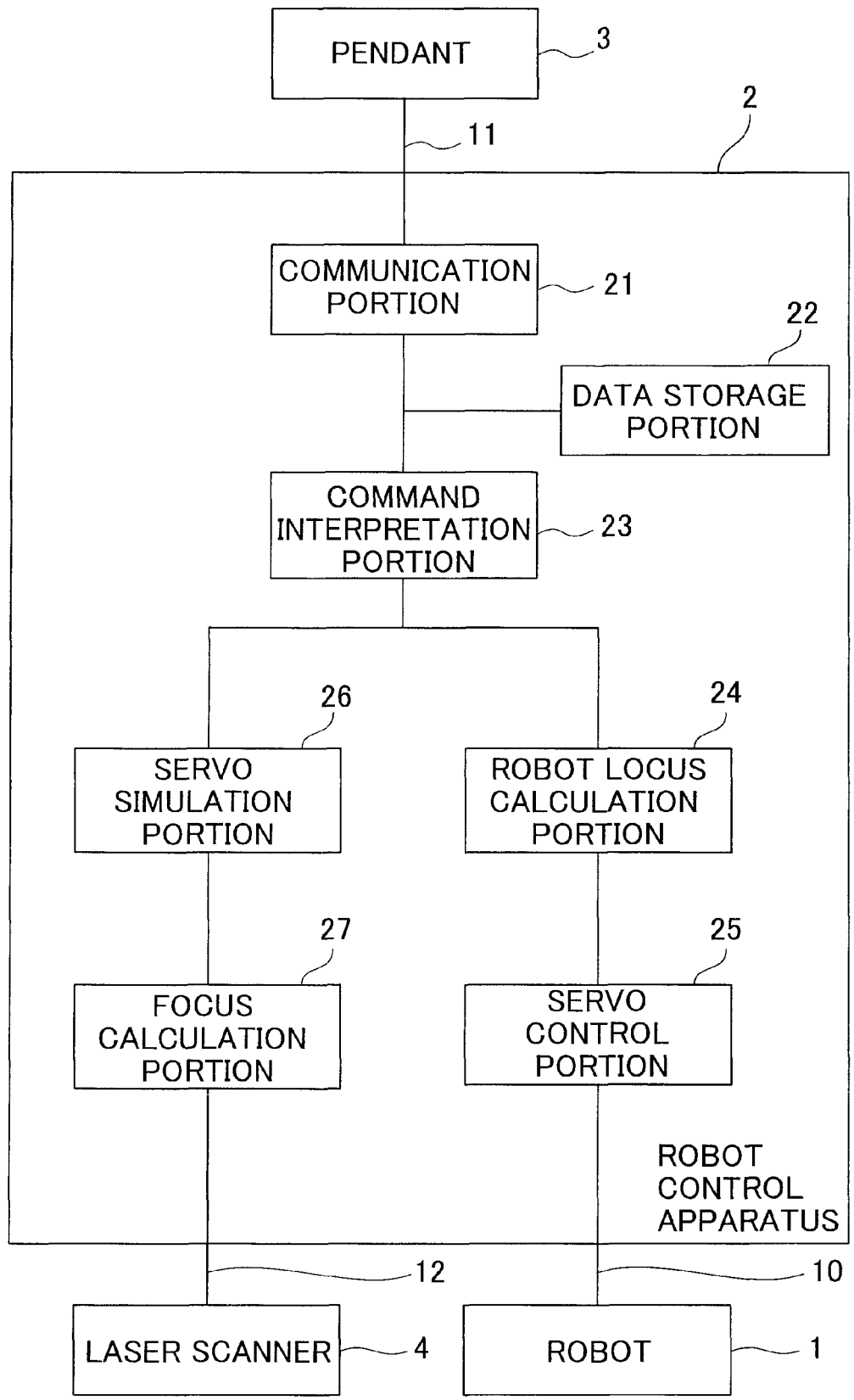
FIG. 2 is a block diagram showing a robot control apparatus of the robot system according to the embodiment of the present invention.
Figure 3:
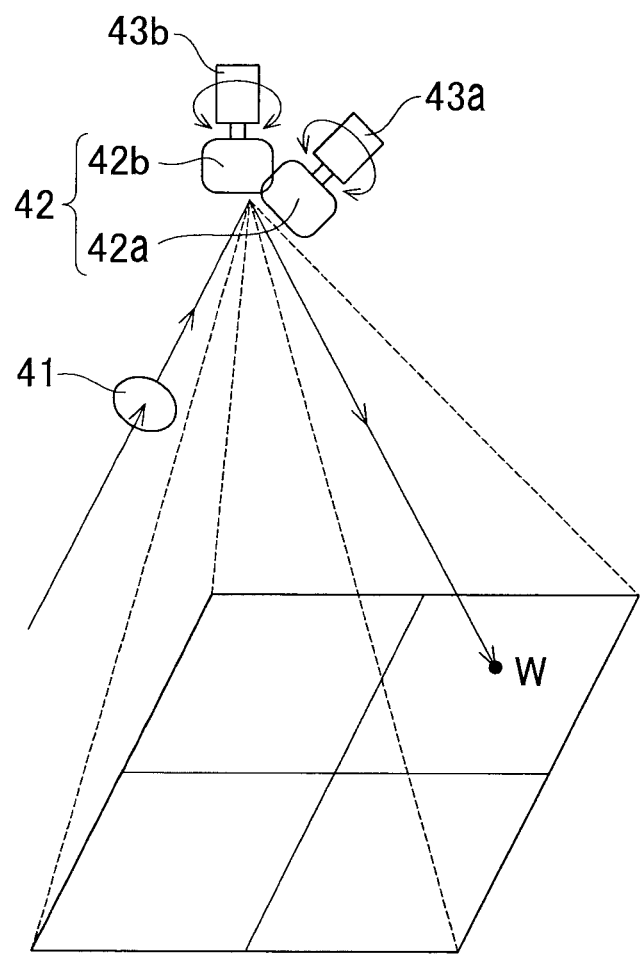
FIG. 3 is a schematic diagram showing the structure of a laser scanner of the robot system according to the embodiment of the present invention.

First, the structure of a robot system 100 according to the embodiment of the present invention is described with reference to FIGS. 1 to 3.

The robot system 100 according to the embodiment of the present invention is a robot system for remote laser welding emitting a laser beam from a position spaced (position spaced about 500 mm, for example) from a target workpiece to perform laser welding. The robot system 100 includes a robot 1, a robot control apparatus 2 controlling the robot 1, and a pendant (programming pendant) 3 to teach operations of the robot 1, as shown in FIG. 1. The robot system 100 according to this embodiment further includes a laser scanner 4 emitting a laser beam, mounted on the robot 1 and a laser oscillator 5 supplying a laser beam to the laser scanner 4. The pendant 3 is an example of the "teaching apparatus" in the present invention, and the laser scanner 4 is an example of the "laser emitting portion" in the present invention.

The robot 1 is a multi-joint type robot having a plurality of joints. The robot 1 includes a plurality of servomotors (not shown) to drive each joint, and the laser scanner 4 mounted on an end portion of the robot can be moved by each servomotor.

Figure 1:
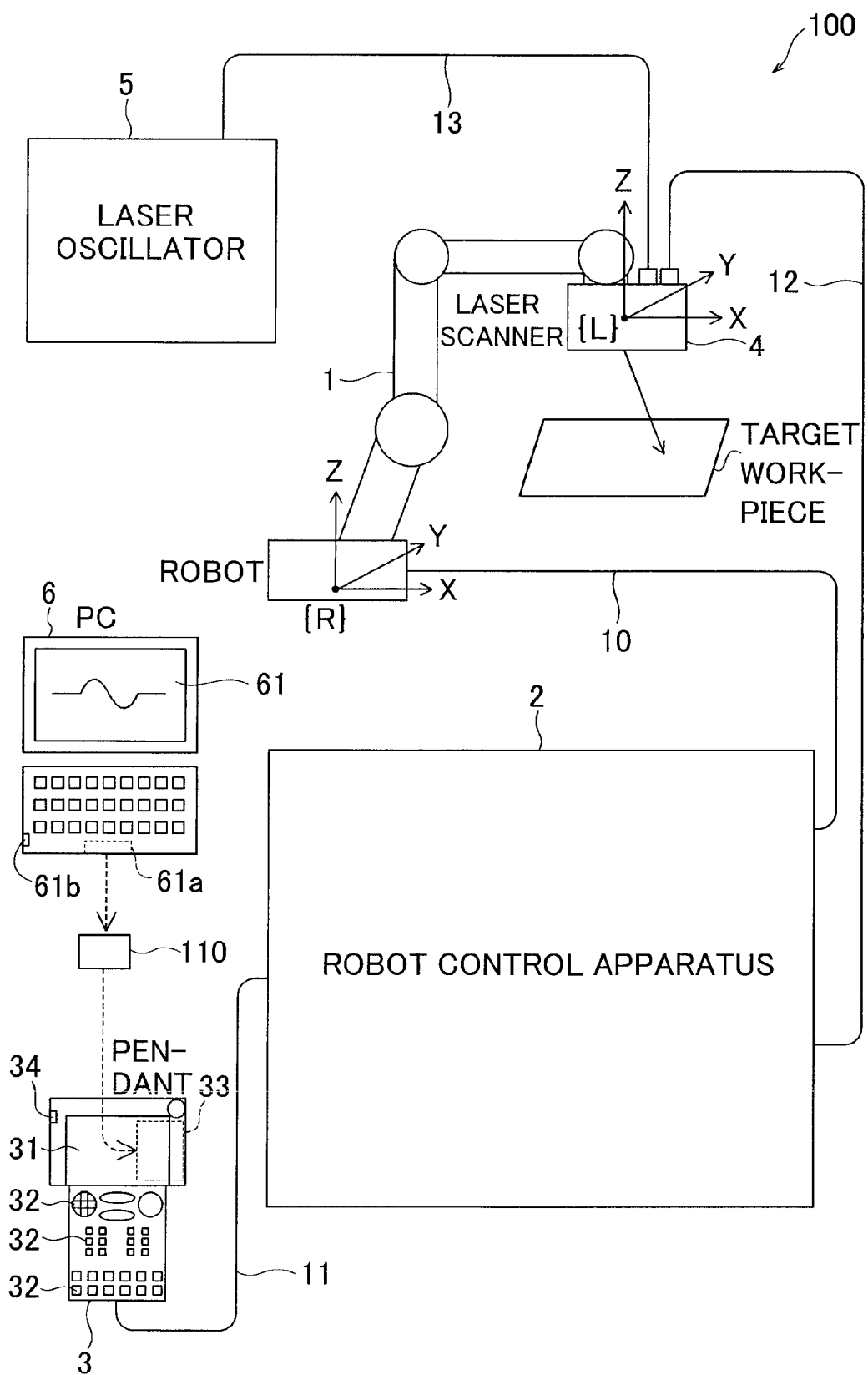
FIG. 1 is a schematic diagram showing the overall structure of a robot system according to an embodiment of the present invention.

The robot control apparatus 2 is connected to the robot 1 through a robot instruction cable 10 to be capable of communication, as shown in FIG. 1. The robot control apparatus 2 is also connected to the pendant 3 through a cable 11 to be capable of communication. The robot control apparatus 2 is also connected to the laser scanner 4 through a scanner instruction cable 12 to be capable of communication. The robot control apparatus 2 includes a communication portion 21 transmitting a signal to and receiving a signal from the pendant 3, a data storage portion 22 storing operation programs, welding information regarding laser welding (information regarding a welding speed and a welding locus), etc., and a command interpretation portion 23 retrieving the operation programs, the welding information, etc. stored in the data storage portion 22 to interpret the information, as shown in FIG. 2.

The robot control apparatus 2 further includes a robot locus calculation portion 24 calculating a movement locus of the robot 1 at every prescribed control cycle on the basis of the interpretation of the command interpretation portion 23 and a servo control portion 25 controlling each servomotor provided in the robot 1 on the basis of the calculation result by the robot locus calculation portion 24. The robot control apparatus 2 is provided with a servo simulation portion 26 presuming a current state of the end portion of the robot 1 (current position and posture of the laser scanner 4) on the basis of an operation instruction transmitted from the servo control portion 25 to each servomotor and a focus calculation portion 27 calculating a focal position (welding position) on the basis of the current position and posture of the end portion of the robot 1 presumed by the servo simulation portion 26. There is a slight time lag between the timing to transmit the operation instruction from the servo control portion 25 and the timing to operate the robot 1 on the basis of the operation instruction. Consequently, the servo simulation portion 26 presumes the current position and posture of the laser scanner 4 in consideration of the time lag. Processing for welding performed by the focus calculation portion 27 will be described later. The focus calculation portion 27 is an example of the "control portion" in the present invention.

The pendant 3 is provided to prepare the operation programs of the robot 1 and the welding information regarding laser welding (information regarding a welding speed and a welding locus). The pendant 3 has a display portion 31 and an operation portion 32 including a plurality of operation buttons, as shown in FIG. 1. A user can input prescribed information by operating the operation portion 32, viewing display on the display portion 31. The user can teach the operations of the robot 1 to the robot control apparatus 2 by operating the pendant 3. The pendant 3 according to this embodiment is provided with a device slot (card slot) 33 allowing a memory card 110 including a compact flash (registered trademark), for example, to be read. Thus, the pendant 3 can capture information related to robot control prepared by an external device such as a PC (personal computer) 6 through the memory card 110. The pendant 3 is provided with a USB (universal serial bus) terminal 34 allowing USB connection. The PC 6 is provided with a device slot (card slot) 61a allowing the memory card 110 to be attached and a USB terminal 61b. In other words, the robot control apparatus 2 (data storage portion 22) accepts information regarding a welding locus prepared by the PC 6 through the USB terminal 34 by inserting a USB memory (not shown) into the USB terminal 34 of the pendant 3 after storing the information regarding a welding locus in the USB memory attached to the USB terminal 61b. Alternatively, the information regarding a welding locus prepared by the PC 6 may be accepted through the USB terminal 34 by connecting the PC 6 and the USB terminal 34 to each other with a USB cable and transmitting the information regarding a welding locus to the pendant 3 through the USB terminal 34. The PC 6 is examples of the "work locus preparation device", the "external device", and the "external information terminal device" in the present invention. The device slot 33 is examples of the "acceptance portion" and the "recording medium read portion" in the present invention, and the USB terminal 34 is an example of the "acceptance portion" in the present invention. The memory card 110 is an example of the "portable recording medium" in the present invention.

The laser scanner 4 has a function of emitting a laser beam output from the laser oscillator 5 to the target workpiece. The laser beam output from the laser oscillator 5 is supplied to the laser scanner 4 through a fiber 13. As shown in FIG. 3, an optical system 41 constituted by a lens, etc., a galvanometer mirror 42 including mirrors 42a and 42b, and motors 43a and 43b driving the mirrors 42a and 42b, respectively, are provided inside the laser scanner 4. The laser beam supplied from the laser oscillator 5 to the laser scanner 4 is condensed by the optical system 41, and thereafter the direction of the laser beam is changed by the galvanometer mirror 42, so that the laser beam is emitted to the target workpiece. The laser scanner 4 is formed to emit a laser beam to a prescribed position along a welding locus by driving the mirrors 42a and 42b on the basis of the calculation result by the focus calculation portion 27. Specifically, the laser scanner 4 according to this embodiment can emit a laser beam within a range of 200 mm square in a state spaced 500 mm from the target workpiece. Thus, the specification of the laser scanner 4 such as a laser focal distance is previously known, and hence it is presumed that a distance from the laser scanner 4 to the target workpiece is the laser focal distance at the time of preparation of a welding locus described later. Furthermore, the distance from the laser scanner 4 to the target workpiece is maintained at the laser focal distance when teaching the operations of the robot 1 or performing laser welding. The laser scanner 4 also includes an adjustment mechanism of the optical system 41 omitted in FIG. 3, and hence the laser scanner 4 can dynamically change the laser focal distance. Thus, the robot system 100 can perform laser welding, changing the distance from the laser scanner 4 to the target workpiece. The galvanometer mirror 42 including the mirrors 42a and 42b is an example of the "mirror member" in the present invention.

Next, a procedure for preparing information regarding an arbitrarily-shaped welding locus with the PC 6 is described with reference to FIGS. 4 to 7.

An arbitrary shape preparation tool, which is software (application program) previously installed on the PC 6, is run, whereby an arbitrary shape preparation tool screen 62 is displayed on a display portion 61 (see FIG. 1) of the PC 6, as shown in FIGS. 4 to 7. The user can select a desired line type from a line type item 62a of the arbitrary shape preparation tool screen 62. Specifically, the arbitrary shape preparation tool screen 62 is formed such that a desired line type can be selected from a straight line, a circular arc, and an ellipse through a graphical user interface (GUI), and the user can prepare the arbitrarily-shaped welding locus by arbitrarily combining different line types, which are a straight line, a circular arc, and an ellipse.

Figure 4:
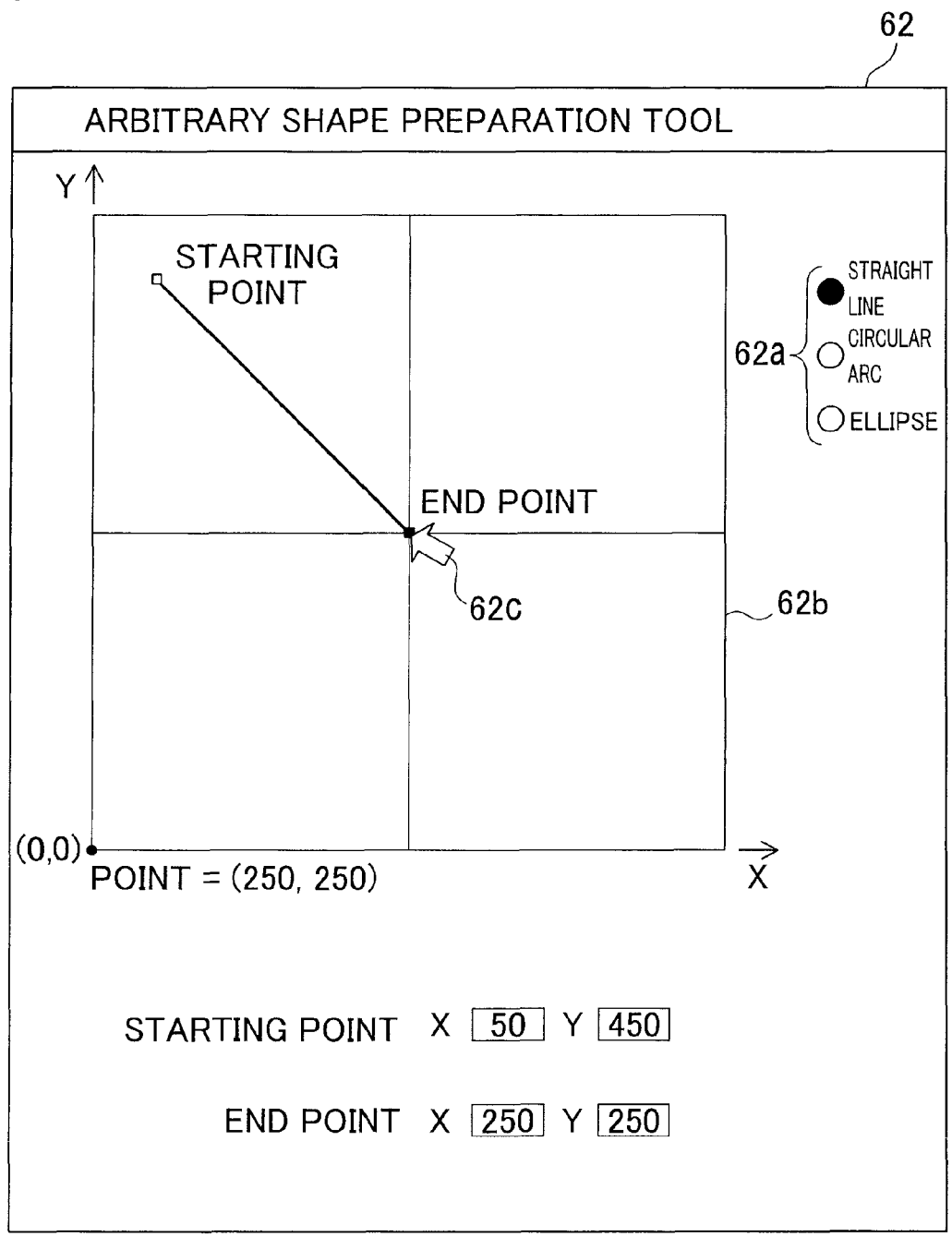
FIG. 4 is a diagram for illustrating a procedure for drawing a straight line welding locus with an arbitrary shape preparation tool of the robot system according to the embodiment of the present invention.

When a straight line is drawn, for example, the straight line is drawn by specifying a starting point and an end point in a preparation area 62b with a pointer 62c after selecting a straight line from the line type item 62a, as shown in FIG. 4. The starting point and the end point are displayed in different colors to be capable of identification. When the prepared straight line is selected with the pointer 62c, the coordinates of the starting point and the end point are displayed on the arbitrary shape preparation tool screen 62. Thus, the user can numerically confirm the positions of the starting point and the end point. The user can also specify the starting point and the end point by directly inputting coordinates numerically. The coordinates of the current position of the pointer 62c are also displayed on the lower side of the preparation area 62b. The preparation area 62b is of 500 squares in terms of coordinate value in an XY plane in which a vertex positioned at the bottom of the left side is an origin. In an example shown in FIG. 4, the pointer 62c is located in the center of the preparation area 62b, and hence the coordinates of the current position of the pointer are displayed as (250, 250).

Figure 5:
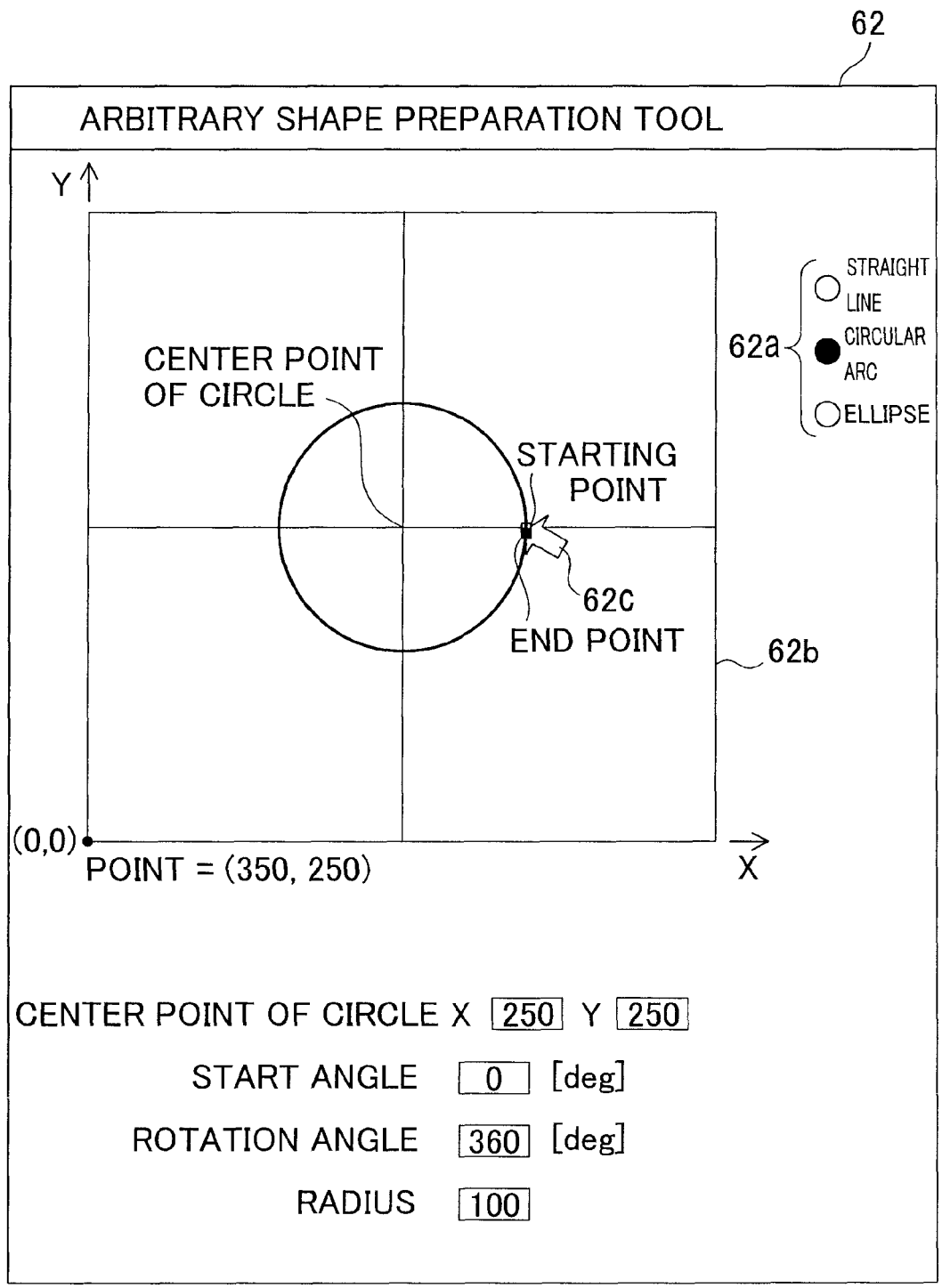
FIG. 5 is a diagram for illustrating a procedure for drawing a circular arc welding locus with the arbitrary shape preparation tool of the robot system according to the embodiment of the present invention.

When a circular arc is drawn, the circular arc is drawn by specifying a center point and a size in the preparation area 62b with the pointer 62c after selecting a circular arc from the line type item 62a, as shown in FIG. 5. When a circular arc is selected, values of the coordinates of the specified center point, a start angle of a locus, a rotation angle from a starting point, and a radius are displayed on the arbitrary shape preparation tool screen 62. The user can arbitrarily set a starting point and an end point of the circular arc by inputting a start angle and a rotation angle. The user can also directly input the coordinates of the center point and a radius numerically. A start angle is positive in a counterclockwise direction relative to the X-axis of the preparation area 62*b* in FIG. 5.

Figure 6:
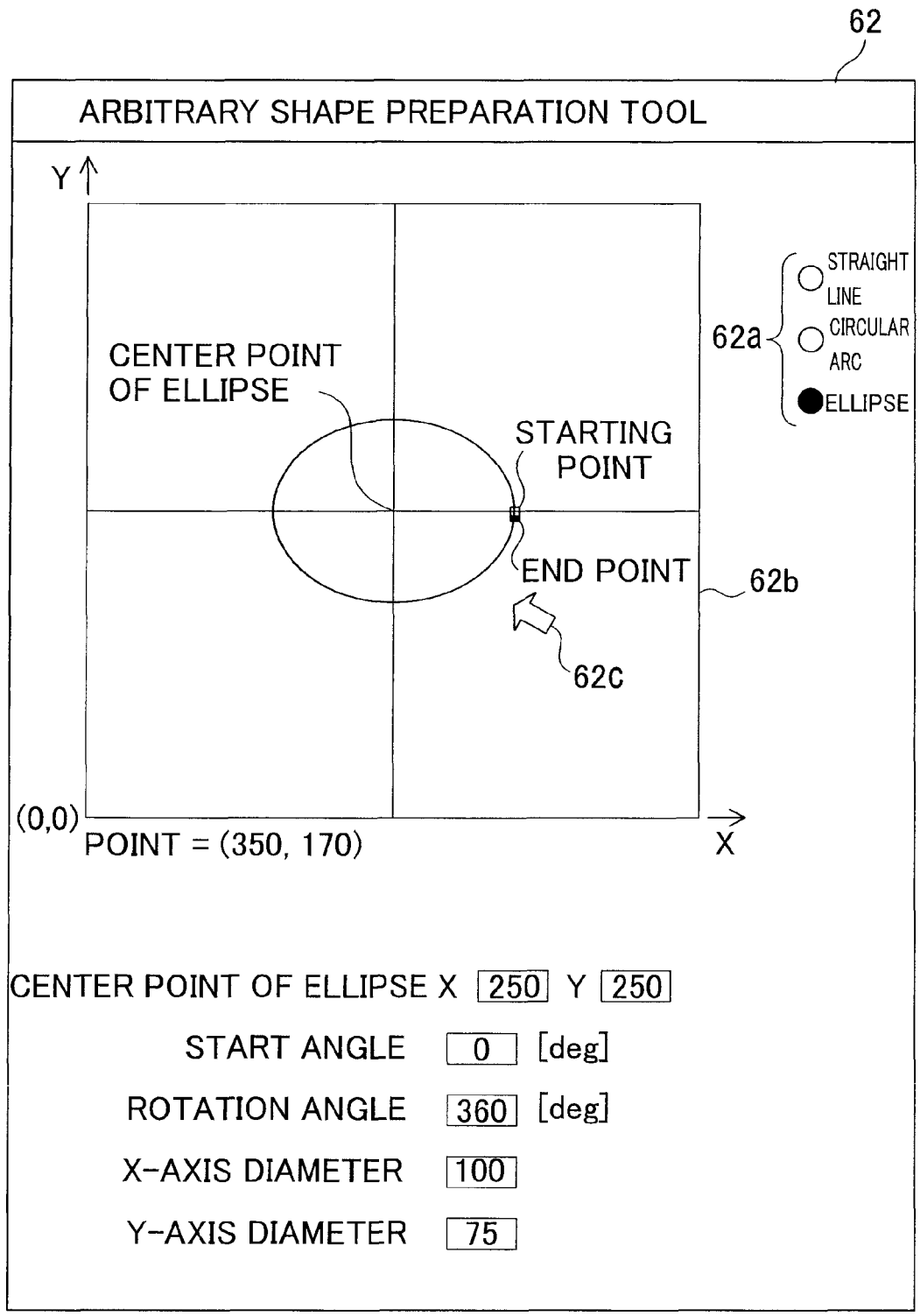
FIG. 6 is a diagram for illustrating a procedure for drawing an ellipse welding locus with the arbitrary shape preparation tool of the robot system according to the embodiment of the present invention.

When an ellipse is drawn, the ellipse is drawn by specifying a center point and a size in the preparation area 62*b* with the pointer 62*c* after selecting an ellipse from the line type item 62*a*, as shown in FIG. 6. When an ellipse is selected, values of the coordinates of the specified center point, a start angle of a locus, a rotation angle from a starting point, and an X-axis diameter, and a Y-axis diameter are displayed on the arbitrary shape preparation tool screen 62. The user can arbitrarily set a starting point and an end point of the ellipse by inputting a start angle and a rotation angle, similarly to the case of a circular arc. The user can also directly input the coordinates of the center point, an X-axis diameter, and a Y-axis diameter numerically. A start angle is positive in a counterclockwise direction relative to the X-axis of the preparation area 62*b* in FIG. 6.

Figure 7:
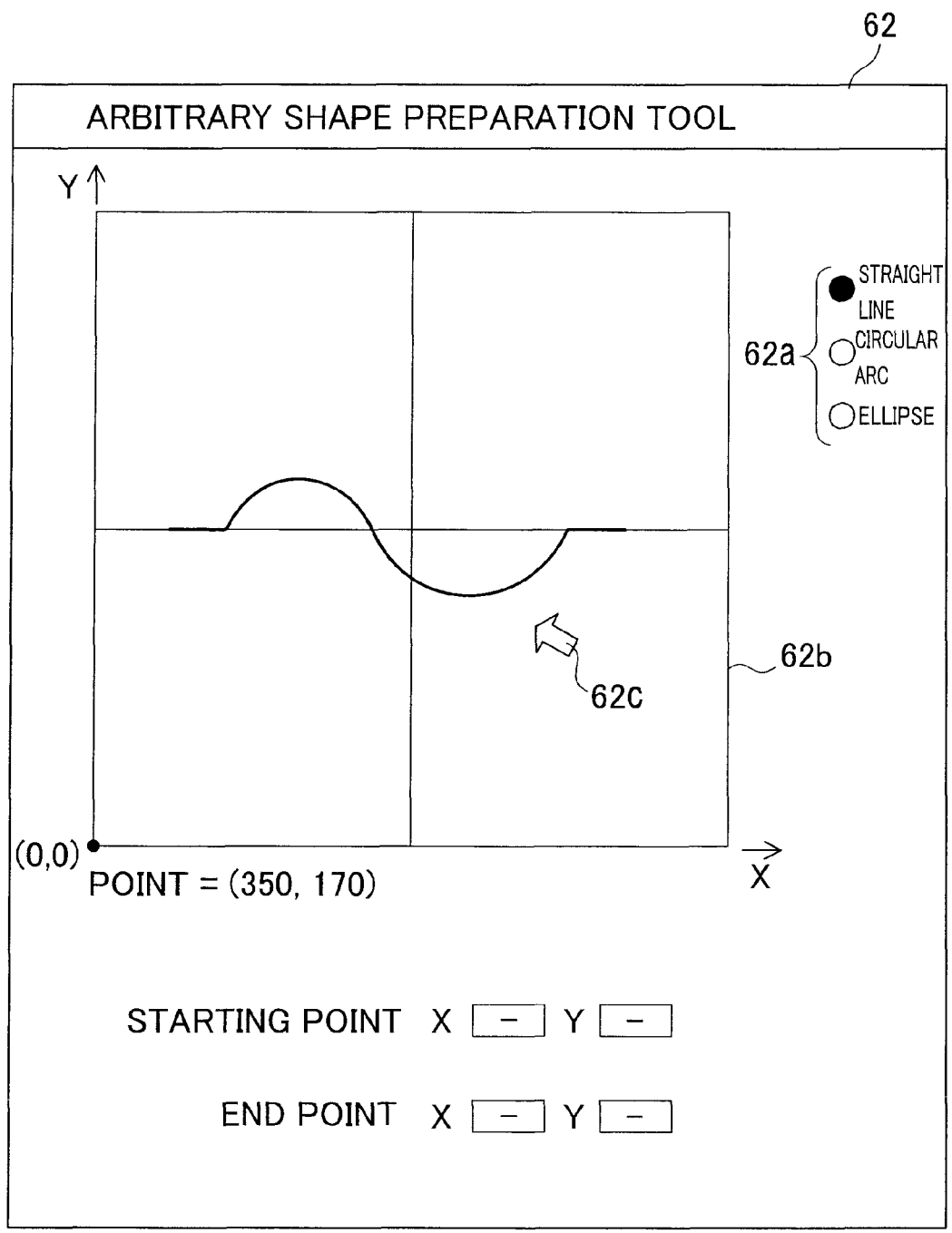
FIG. 7 is a diagram showing a state where an arbitrarily-shaped welding locus has been drawn with the arbitrary shape preparation tool of the robot system according to the embodiment of the present invention.

The user can arbitrarily combine a straight line, a circular arc, and an ellipse drawn in the aforementioned manners in the preparation area 62*b* to prepare the arbitrarily-shaped welding locus, as shown in FIG. 7. Then, information regarding the arbitrarily-shaped welding locus prepared with the arbitrary shape preparation tool is stored as a file in the memory card 110 attached to the device slot 61*a* of the PC 6, in the PC 6, or in the USB memory (not shown) attached to the USB terminal 61*b* of the PC 6. Thus, the information regarding the arbitrarily-shaped welding locus is prepared with the PC 6.

Next, a preparation procedure prior to welding is described with reference to FIGS. 1 and 4 to 9.

First, the information regarding the arbitrarily-shaped welding locus prepared with the PC 6 is loaded onto the robot control apparatus 2. Specifically, the memory card 110 storing the information regarding the welding locus is inserted into the device slot 33 of the pendant 3 to load the information onto the data storage portion 22. Alternatively, the information regarding the welding locus stored in the PC 6 or the USB memory may be loaded onto the data storage portion 22 through the USB terminal 34 with the USB cable or the USB memory.

The operations of the robot 1 are taught to the robot control apparatus 2 while the robot 1 is moved with the pendant 3. A section where welding is performed (welding section) is set with the pendant 3. The welding section is set by specifying a size on a laser welding condition file screen 311 described later and teaching a first reference point B1 and a second reference point B2 described later.

Figures 8, 9:
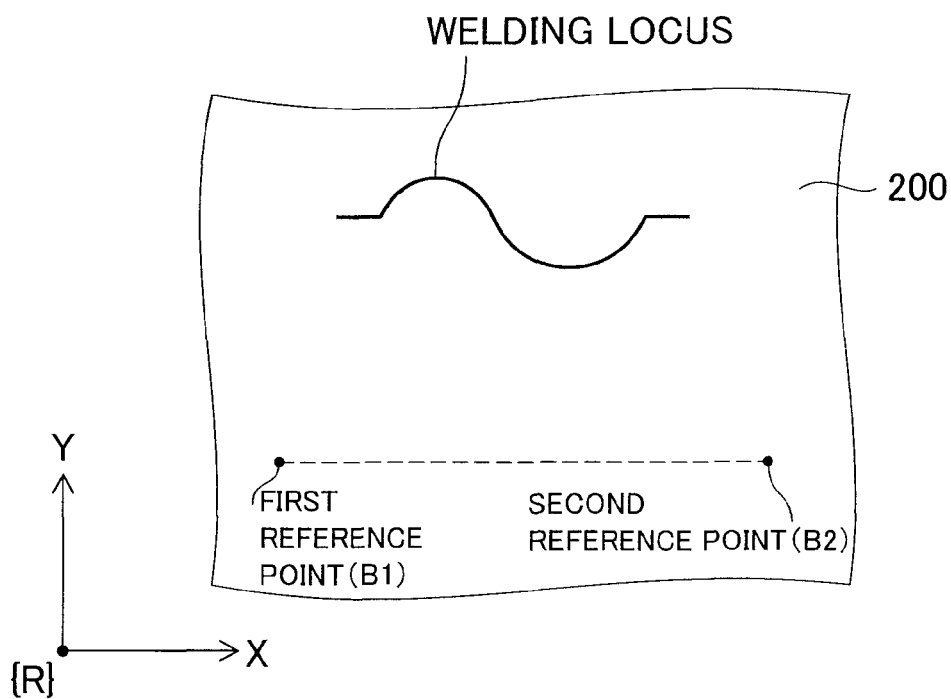
FIG. 8 is a diagram showing a laser welding condition file screen of the robot system according to the embodiment of the present invention.
FIG. 9 is a diagram for illustrating an operation procedure for teaching a reference position and a reference direction of the arbitrarily-shaped welding locus in the robot system according to the embodiment of the present invention.

Welding information regarding laser welding (information regarding a welding speed and a welding locus) is set. Specifically, when laser welding is performed on the basis of the arbitrarily-shaped welding locus prepared by the PC 6, "arbitrary shape" is selected as an interpolation type on the laser welding condition file screen 311 displayed on the display portion 31 (see FIG. 1) of the pendant 3, as shown in FIG. 8. The "interpolation type" denotes one of control parameters for specifying how an operation locus of the end portion of the robot 1 should be when the end portion of the robot 1 is moved between a plurality of positions taught to the robot 1 (taught points). "Straight line" (not shown) and "circular arc" (not shown) in addition to "arbitrary shape" can be specified as the interpolation type. "Straight line" is often specified as the interpolation type when a complicated welding locus as in this embodiment is not employed.

A value of laser output and a welding speed are set on the laser welding condition file screen 311. According to this embodiment, multiple pieces of the information (file) regarding the arbitrarily-shaped welding locus prepared by the PC 6 can be loaded onto the data storage portion 22 to be stored, and a desired welding locus is selected by specifying a file number (FILE No. in FIG. 8). Furthermore, the length of a side in a case where the preparation area 62*b* (see FIGS. 4 to 7) having an area of 500 squares (direction X, direction Y) in the coordinate is reflected in a work area 200 (see FIG. 9) of the target workpiece is specified. If 500 in the coordinate is set to 50 mm in the work area 200, for example, the size is specified as "50" mm. In this case, a welding locus drawn in the preparation area 62*b* of 500 squares is automatically scaled in an area of 50 mm square.

A reference position and a reference direction of the arbitrarily-shaped welding locus prepared with the PC 6 are taught to the robot control apparatus 2 while the robot 1 is moved with the pendant 3. Specifically, as shown in FIG. 9, the user moves the robot 1 to emit a laser beam for teaching from the laser scanner 4, and teaches the first reference point B1 serving as the reference position to the robot control apparatus 2 at a desired position while confirming the position of the laser beam on the work area 200. Thus, a position $^R$B1 of the first reference point B1 as viewed from a robot coordinate system {R} fixed to a setting portion of the robot 1 is taught. The first reference point B1 serving as the reference position is a point where an origin in the preparation area 62*b* (vertex positioned at the bottom of the left side of the preparation area 62*b*) is located when the preparation area 62*b* (see FIGS. 4 to 7) is reflected in the work area 200. Similarly to the case of the first reference point B1, the user moves the robot 1 to emit a laser beam for teaching from the laser scanner 4, and teaches the second reference point B2 to the robot control apparatus 2 while confirming the position of the laser beam on the work area 200. Thus, a position $^R$B2 of the second reference point B2 as viewed from the robot coordinate system {R} is taught. Furthermore, a direction from the first reference point B1 toward the second reference point B2 is taught as the reference direction of the arbitrarily-shaped welding locus. The direction from the first reference point B1 toward the second reference point B2 serving as the reference direction is a direction X in the preparation area 62*b* in a case where the preparation area 62*b* (see FIGS. 4 to 7) is reflected in the work area 200. Thus, a positional relation between the XY plane of the preparation area 62*b* and the robot coordinate system {R} is set, whereby the arbitrarily-shaped welding locus prepared with the PC 6 is positioned in the work area 200. The robot coordinate system {R} is an example of the "first coordinate system" in the present invention.

Next, the processing for welding by the focus calculation portion 27 performed when the robot system 100 according to this embodiment performs laser welding is described with reference to FIGS. 8 to 14.

Figure 10:
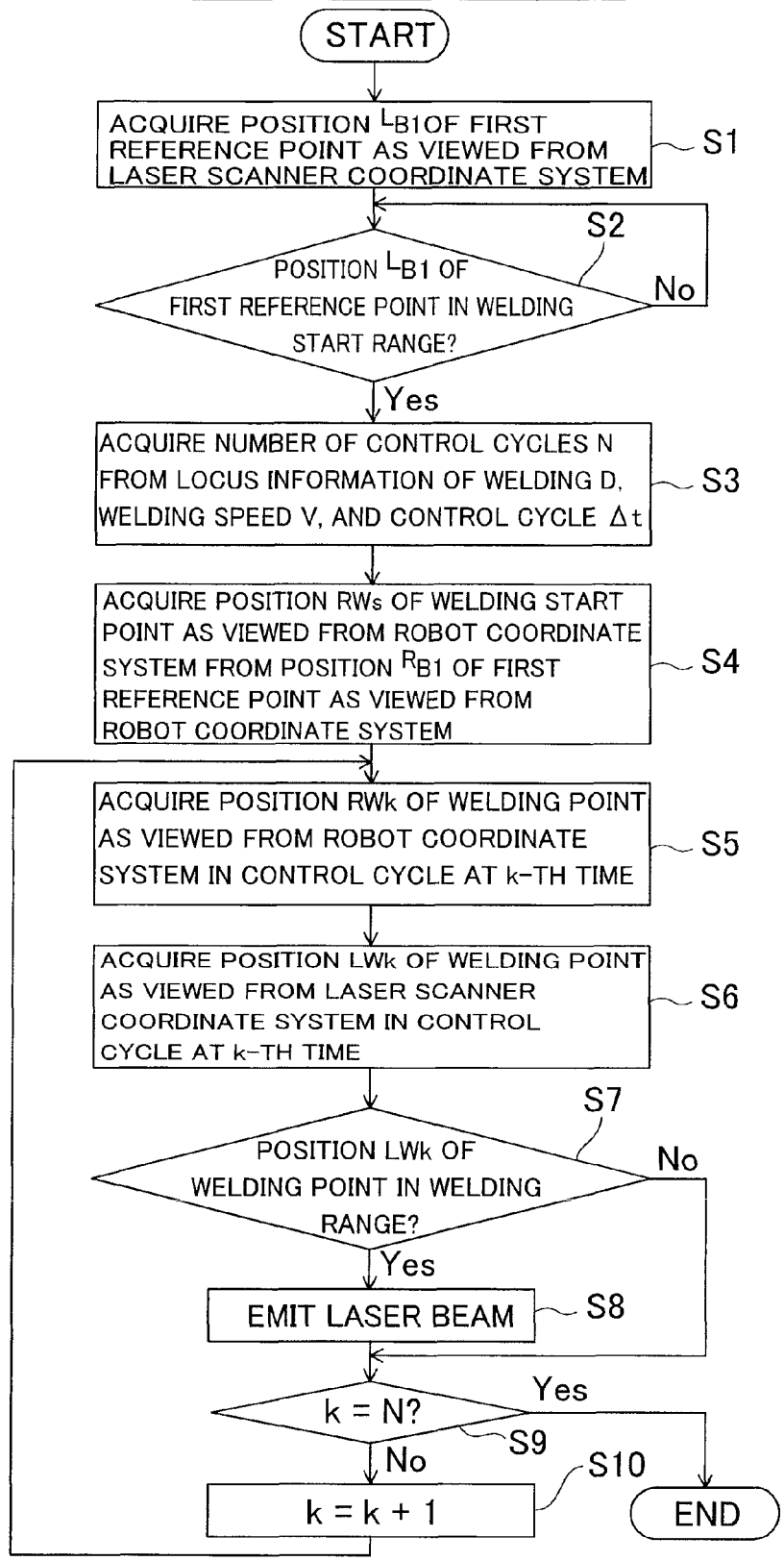
FIG. 10 is a flowchart for illustrating processing for welding by a focus calculation portion of the robot system according to the embodiment of the present invention.

At a step S1 in FIG. 10, the focus calculation portion 27 acquires a position $^L$B1 of the first reference point B1 (see FIG. 9) as viewed from a laser scanner coordinate system {L} fixed to the laser scanner 4. Specifically, the focus calculation portion 27 acquires the position $^L$B1 of the first reference point B1 as viewed from the laser scanner coordinate system {L} on the basis of a current position and posture $^R_L$T of the laser scanner 4 as viewed from the robot coordinate system {R} presumed by the servo simulation portion 26 and the taught position $^R B1$ of the first reference point B1 as viewed from the robot coordinate system {R}. The laser scanner coordinate system {L} is an example of the "second coordinate system" in the present invention.

An expression for obtaining the position $^L B1$ of the first reference point B1 as viewed from the laser scanner coordinate system {L} is shown as the following expression (1).

$$^L B1(X_{B1}, Y_{B1}) = (^R_L T)^{-1} \cdot ^R B1 \qquad (1)$$

In the aforementioned expression (1), $^L B1$ represents the position of the first reference point B1 as viewed from the laser scanner coordinate system {L}, $X_{B1}$ represents the X-coordinate of the position $^L B1$ of the first reference point B1 as viewed from the laser scanner coordinate system {L}, $Y_{B1}$ represents the Y-coordinate of the position $^L B1$ of the first reference point B1 as viewed from the laser scanner coordinate system {L}, $^R_L T$ represents the current position and posture of the laser scanner 4 as viewed from the robot coordinate system {R} presumed by the servo simulation portion 26, and $^R B1$ represents the position of the first reference point B1 as viewed from the robot coordinate system {R}. $(^R_L T)^{-1}$ denotes inverse transform of $^R_L T$, and represents the current position and posture of the origin of the robot coordinate system {R} as viewed from the laser scanner coordinate system {L}.

Figure 11:
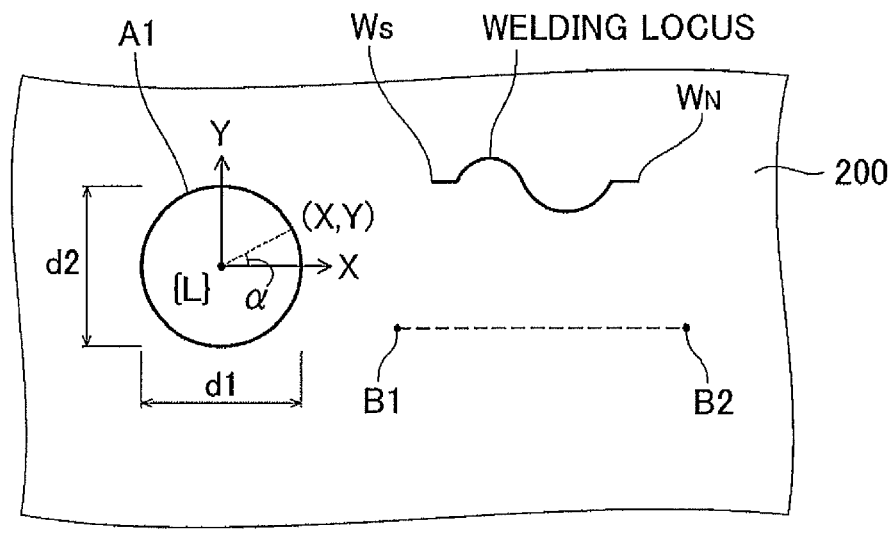
FIG. 11 is a diagram showing a welding start range of the robot system according to the embodiment of the present invention.

The focus calculation portion 27 determines whether or not the position $^L B1$ of the first reference point B1 is in a welding start range A1 (see FIGS. 11 and 12) at a step S2. The user sets values of an X-axis diameter d1 and a Y-axis diameter d2 of a circle or an ellipse centered around the origin of the laser scanner coordinate system {L} to determine the welding start range A1, as shown in FIG. 11. The user can freely set the X-axis diameter d1 and the Y-axis diameter d2. However, if too large diameters are set as the X-axis diameter d1 and the Y-axis diameter d2, a laser beam is emitted to a great distance from the laser scanner 4, and hence a maximum settable value of each diameter is set to 200 mm. In this embodiment, the X-axis diameter d1 and the Y-axis diameter d2 both are set to 180 mm, for example. The welding start range A1 is moved in the direction X in association with movement of the laser scanner 4 along the direction X by the robot 1. The welding start range A1 is an example of the "prescribed range of the laser emitting portion" in the present invention.

Next, an expression for determining whether or not the position $^L B1$ of the first reference point B1 is in the welding start range A1 is shown as the following expression (2-5). The expressions (2-1) to (2-4) are for describing a procedure for calculating the expression (2-5).

First, an X-coordinate and a Y-coordinate located in the welding start range A1 shown in FIG. 11 are defined by the following expressions (2-1) and (2-2).

$$X \leq d1/2 \times \cos(\alpha) \qquad (2-1)$$

$$Y \leq d2/2 \times \sin(\alpha) \qquad (2-2)$$

These expressions are transformed to obtain the following expressions (2-3) and (2-4).

$$4X^2/d1^2 \leq \cos^2(\alpha) \qquad (2-3)$$

$$4Y^2/d2^2 \leq \sin^2(\alpha) \qquad (2-4)$$

Then, the expression (2-5) to be satisfactory in a case where the position $^L B1$ of the first reference point B1 is located in the welding start range A1 is obtained from the aforementioned expressions (2-3) and (2-4).

$$4(X_{B1}^2/d1^2 + Y_{B1}^2/d2^2) \leq 1 \qquad (2-5)$$

In the aforementioned expression (2-5), $X_{B1}$ represents the X-coordinate of the position $^L B1$ of the first reference point B1 as viewed from the laser scanner coordinate system {L}, Y represents the Y-coordinate of the position $^L B1$ of the first reference point B1 as viewed from the laser scanner coordinate system {L}, d1 represents the X-axis diameter of the welding start range A1, and d2 represents the Y-axis diameter of the welding start range A1.

Figure 12:
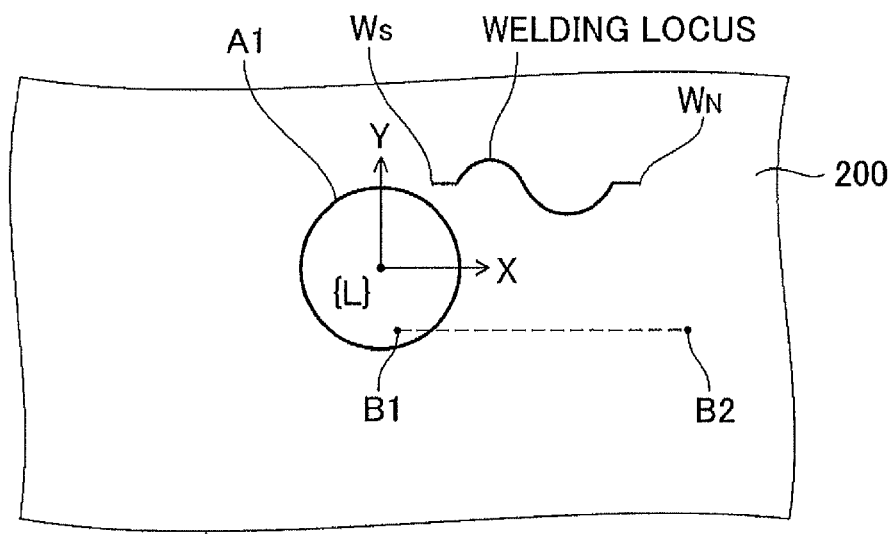
FIG. 12 is a diagram showing a state where a first reference point is in the welding start range of the robot system according to the embodiment of the present invention.

The focus calculation portion 27 repeats this determination until the position $^L B1$ of the first reference point B1 enters the welding start range A1. As shown in FIG. 12, the focus calculation portion 27 acquires the number of control cycles N in the welding section on the basis of the welding information (information regarding a welding speed and a welding locus) at a step S3 when the position $^L B1$ of the first reference point B1 enters the welding start range A1. Specifically, the focus calculation portion 27 calculates the number of control cycles N on the basis of locus information of welding D, a welding speed V, and a control cycle of the robot 1 $\Delta t$. The locus information of welding D is based on the welding information (information regarding a welding speed and a welding locus) set with the pendant 3, and is information regarding the shape of a welding locus including the size (length) of a locus, the direction of a locus, etc. The welding speed V is a welding speed set on the laser welding condition file screen 311 shown in FIG. 8. At this stage, "0 (zero)" is assigned to a variable k described later for initialization.

Next, an expression for acquiring the number of control cycles N in the welding section is shown as the following expression (3).

$$N = D/(V \times \Delta t) \qquad (3)$$

In the aforementioned expression (3), N represents the number of control cycles in the welding section (integer of at least 0), D represents the locus information of welding (length of a welding locus in this case), V represents the welding speed, and $\Delta t$ represents the control cycle. If the right side of the expression (3) cannot be divided, N is set to a value obtained by discarding all digits to the right of the decimal point of $D/(V \times \Delta t)$.

Thereafter, the focus calculation portion 27 acquires a welding start point $^R Ws$ as viewed from the robot coordinate system {R} on the basis of the position $^R B1$ of the first reference point B1 as viewed from the robot coordinate system {R} and the reference direction (direction from the first reference point B1 toward the second reference point B2) at a step S4. Then, the focus calculation portion 27 acquires a position $^R Wk$ of a welding point as viewed from the robot coordinate system {R} in the control cycle at k-th time in the welding section at a step S5. Here, k is an integer (where $0 \leq k \leq N$).

Next, an expression for acquiring the position $^R Wk$ of the welding point as viewed from the robot coordinate system {R} in the control cycle at k-th time is shown as the following expression (4).

$$^R Wk = ^R Ws + D(k/N) \qquad (4)$$

In the aforementioned expression (4), $^R Wk$ represents the position of the welding point as viewed from the robot coordinate system {R} in the control cycle at k-th time, $^R Ws$ represents the welding start point as viewed from the robot coordinate system {R}, D represents the locus information of welding (length of a welding locus in this case), and N represents the number of control cycles in the welding section.

At a step S6, the focus calculation portion 27 acquires a position $^L Wk$ of the welding point as viewed from the laser scanner coordinate system {L} in the control cycle at k-th time. Specifically, the focus calculation portion 27 calculates the position $^L Wk$ of the welding point as viewed from the laser scanner coordinate system {L} in the control cycle at k-th time on the basis of the current position and posture $^R_L T$ of the laser scanner 4 as viewed from the robot coordinate system {R} presumed by the servo simulation portion 26 and the position $^R Wk$ of the welding point as viewed from the robot coordinate system {R} in the control cycle at k-th time.

Next, an expression for acquiring the position $^L Wk$ of the welding point as viewed from the laser scanner coordinate system {L} in the control cycle at k-th time is shown as the following expression (5).

$$^L Wk(X_k, Y_k) = (^R_L T)^{-1} \cdot {}^R Wk \tag{5}$$

In the aforementioned expression (5), $^L Wk$ represents the position of the welding point as viewed from the laser scanner coordinate system {L} in the control cycle at k-th time, $X_k$ represents the X-coordinate of the welding point as viewed from the laser scanner coordinate system {L} in the control cycle at k-th time, $Y_k$ represents the Y-coordinate of the welding point as viewed from the laser scanner coordinate system {L} in the control cycle at k-th time, $^R_L T$ represents the current position and posture of the laser scanner 4 as viewed from the robot coordinate system {R} presumed by the servo simulation portion 26, $^R Wk$ represents the position of the welding point as viewed from the robot coordinate system {R} in the control cycle at k-th time, and k represents an integer (where 0≤k≤N). $(^R_L T)^{-1}$ denotes inverse transform of $^R_L T$, and represents the current position and posture of the origin of the robot coordinate system {R} as viewed from the laser scanner coordinate system {L}.

Figure 13:
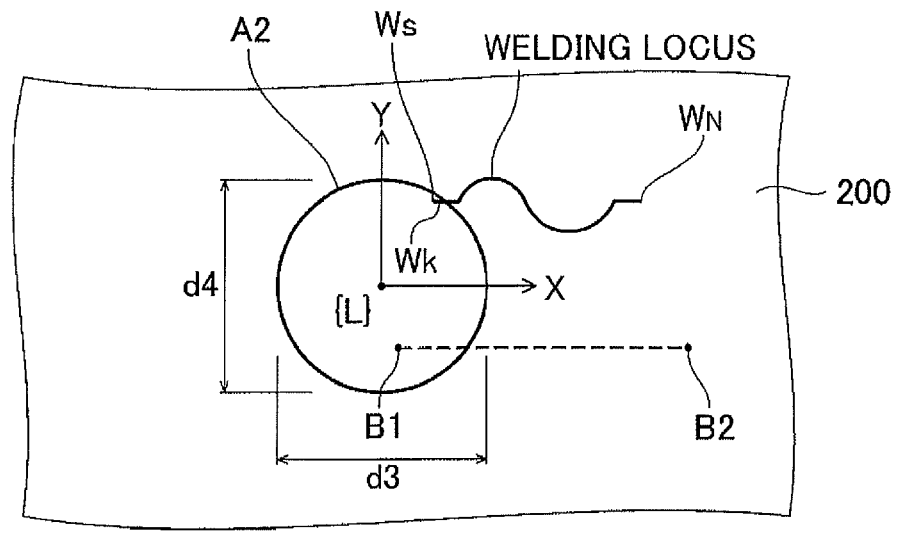
FIG. 13 is a diagram showing a welding range of the robot system according to the embodiment of the present invention.
Figure 14:
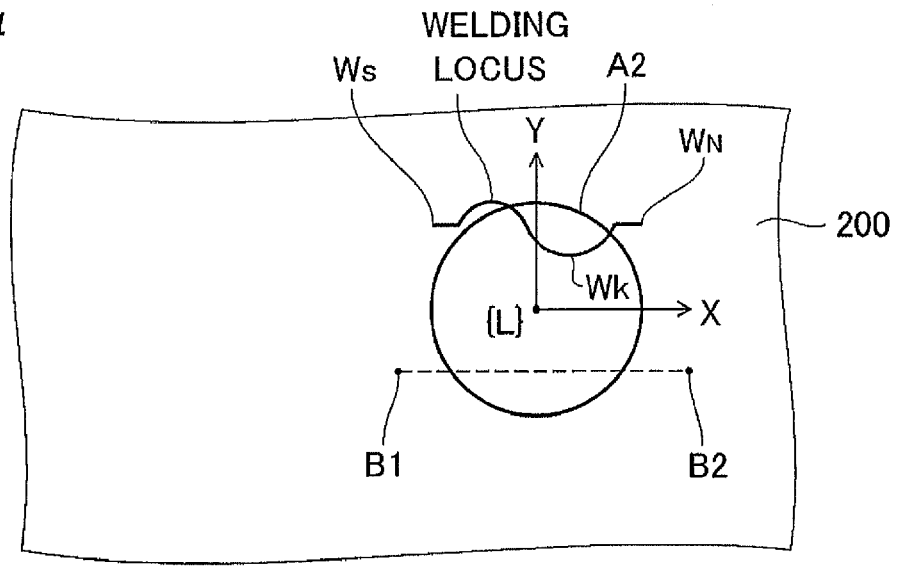
FIG. 14 is a diagram showing a state where a welding point is located in the welding range of the robot system according to the embodiment of the present invention.

At a step S7, the focus calculation portion 27 determines whether or not the position $^L Wk$ of the welding point as viewed from the laser scanner coordinate system {L} in the control cycle at k-th time is in a welding range A2 (see FIGS. 13 and 14). The user sets values of an X-axis diameter d3 and a Y-axis diameter d4 of a circle or an ellipse centered around the origin of the laser scanner coordinate system {L} to determine the welding range A2, as shown in FIG. 13. The user can freely set the X-axis diameter d3 and the Y-axis diameter d4. However, similarly to the X-axis diameter d1 and the Y-axis diameter d2 of the welding start range A1, if too large diameters are set as the X-axis diameter d3 and the Y-axis diameter d4, a laser beam is emitted to a great distance from the laser scanner 4, and hence a maximum settable value of each diameter is set to 200 mm. In this embodiment, the X-axis diameter d3 and the Y-axis diameter d4 both are set to 200 mm, for example. In other words, the welding range A2 is set to be larger than the welding start range A1 (the X-axis diameter and the Y-axis diameter both are 180 mm) of the laser scanner 4. The welding range A2 is moved in the direction X in association with the movement of the laser scanner 4 along the direction X by the robot 1. The welding range A2 is an example of the "working range to which the laser beam can be emitted" in the present invention.

Next, an expression for determining whether or not the position $^L Wk$ of the welding point as viewed from the laser scanner coordinate system {L} in the control cycle at k-th time is in the welding range A2 is shown as the following expression (6). The expression (6) is calculated through a procedure similar to the case of the aforementioned expression (2-5).

$$4(X_k^2/d3^2 + Y_k^2/d4^2) \leq 1 \tag{6}$$

In the aforementioned expression (6), $X_k$ represents the X-coordinate of the welding point as viewed from the laser scanner coordinate system {L} in the control cycle at k-th time, $Y_k$ represents the Y-coordinate of the welding point as viewed from the laser scanner coordinate system {L} in the control cycle at k-th time, d3 represents the X-axis diameter of the welding range A2, and d4 represents the Y-axis diameter of the welding range A2.

At a step S8, the focus calculation portion 27 controls the laser scanner 4 to emit a laser beam to the welding point Wk in the control cycle at k-th time if the position $^L Wk$ of the welding point as viewed from the laser scanner coordinate system {L} in the control cycle at k-th time is in the welding range A2, as shown in FIGS. 13 and 14. On the other hand, the focus calculation portion 27 advances to a step S9 without emitting a laser beam if the position $^L Wk$ of the welding point as viewed from the laser scanner coordinate system {L} in the control cycle at k-th time is not in the welding range A2. Thus, the laser scanner 4 can be inhibited from emitting a laser beam to an improper position. If the position $^L Wk$ of the welding point as viewed from the laser scanner coordinate system {L} in the control cycle at k-th time does not enter the welding range A2 and welding cannot be properly performed on a desired welding locus, a relation between a movement locus (movement path) of the laser scanner 4 moved by the robot 1 and the welding information (information regarding a welding speed and a welding locus) is improper, and hence proper welding can be performed by resetting the relation between this movement locus and the welding information.

At the step S9, the focus calculation portion 27 determines whether or not k is equal to N, and terminates the processing for welding if k is equal to N. If k is not equal to N (k<N), the focus calculation portion 27 increments k at a step S10 to repeat the steps S5 to S10 until k becomes equal to N. In the robot system 100 according to this embodiment, whether or not to emit a laser beam from the current position and posture $^R_L T$ of the laser scanner 4 is determined at every control cycle Δt of the robot 1, and hence the movement speed of the laser scanner 4 does not depend on the welding speed V, dissimilarly to a case where the position and posture of the laser scanner 4 at the start of laser beam emission and the position and posture of the laser scanner 4 at the end of laser beam emission are previously set. Furthermore, according to this embodiment, the position of the laser scanner 4 may be simply adjusted by the operations of the robot 1 such that the position $^L Wk$ of the welding point as viewed from the laser scanner coordinate system {L} in the control cycle at k-th time is located in the welding range A2, and a movement locus of the laser scanner 4 and the welding locus may not be matched. Furthermore, in the robot system 100 according to this embodiment, whether or not the position $^L Wk$ of the welding point as viewed from the laser scanner coordinate system {L} in the control cycle at k-th time is located in the welding range A2 is determined, whereby the robot system 100 can correspond to the arbitrarily-shaped welding locus regardless of whether or not the laser scanner 4 is moving.

According to this embodiment, as hereinabove described, the robot system 100 is provided with the focus calculation portion 27 controlling the laser scanner 4 to emit a laser beam on the basis of the information regarding the arbitrarily-shaped welding locus and the current position and posture $^R_L T$ of the laser scanner 4, whereby the focus calculation portion 27 can control the laser scanner 4 to emit the laser beam in consideration of the movement state of the laser scanner 4, and hence the laser beam can be properly emitted to the arbitrarily-shaped welding locus in response to the movement of the laser scanner 4 even when the laser scanner 4 in motion emits the laser beam. Consequently, welding corresponding to the arbitrarily-shaped welding locus can be performed.

According to this embodiment, as hereinabove described, the focus calculation portion 27 is so formed as to control the laser scanner 4 to emit a laser beam on the basis of the information regarding the arbitrarily-shaped welding locus prepared with the PC 6 and the current position and posture $^{R}_{L}T$ of the laser scanner 4. Thus, the information regarding the arbitrarily-shaped welding locus can be easily prepared with the PC 6, which is an external device, and welding corresponding to the arbitrarily-shaped welding locus can be performed.

According to this embodiment, as hereinabove described, the device slot 33 accepting the information regarding the arbitrarily-shaped welding locus prepared with the PC 6 through the memory card 110 is provided on the pendant 3. The information regarding the arbitrarily-shaped welding locus prepared by the PC 6 can be acquired through the device slot 33 on the basis of the operation of the pendant 3 through the file screen 311. Furthermore, the focus calculation portion 27 is so formed as to control the laser scanner 4 to emit a laser beam on the basis of the information regarding the arbitrarily-shaped welding locus accepted by the device slot 33 and the current position and posture $^{R}_{L}T$ of the laser scanner 4. Thus, the information regarding the arbitrarily-shaped welding locus prepared with the PC 6 can be easily accepted by the device slot 33 through the memory card 110, and hence welding corresponding to the arbitrarily-shaped welding locus prepared with the PC 6, which is an external device, can be easily performed.

According to this embodiment, as hereinabove described, the focus calculation portion 27 is so formed as to acquire the welding point Wk corresponding to the arbitrarily-shaped welding locus on the basis of the information regarding the arbitrarily-shaped welding locus and the first reference point B1 and the reference direction (direction from the first reference point B1 toward the second reference point B2) taught by the pendant 3, and control the laser scanner 4 to emit a laser beam to the acquired welding point Wk. Thus, the arbitrarily-shaped welding locus prepared by the PC 6, which is an external device, can be easily reflected in the work area 200 of the target workpiece with the first reference point B1 and the reference direction, and hence welding corresponding to the arbitrarily-shaped welding locus prepared with the PC 6, which is an external device, can be easily performed.

According to this embodiment, as hereinabove described, the robot system 100 is formed to correspond to an arbitrary shape prepared by arbitrarily combining the different line types, which are a straight line, a circular arc, and an ellipse. Thus, the arbitrarily-shaped welding locus can be prepared by arbitrarily combining the three line types, which are a straight line, a circular arc, and an ellipse, and hence the robot system 100 having a high degree of freedom for a welding locus can be provided.

According to this embodiment, as hereinabove described, the focus calculation portion 27 is so formed as to determine whether or not the welding point Wk corresponding to the arbitrarily-shaped welding locus is located in the welding range A2 to which the laser scanner 4 can emit a laser beam regardless of whether or not the laser scanner 4 is moving, and control the laser scanner 4 to emit a laser beam if the welding point Wk is located in the welding range A2. Thus, a laser beam is not emitted if the welding point Wk is not located in the welding range A2, and hence the laser scanner 4 can be inhibited from emitting a laser beam to an improper position by emitting the laser beam despite the welding point Wk to which the laser beam cannot be emitted from the current position and posture $^{R}_{L}T$ of the laser scanner 4.

According to this embodiment, as hereinabove described, the laser scanner 4 includes the galvanometer mirror 42 actuatable for emitting a laser beam to the target workpiece while changing the direction of the laser beam, and the focus calculation portion 27 is so formed as to control the laser scanner 4 to emit a laser beam to a plurality of welding points Wk along the arbitrarily-shaped welding locus while actuating the galvanometer mirror 42 regardless of whether or not the laser scanner 4 is moving. Thus, the focus of the laser beam can follow the welding locus to perform welding while the galvanometer mirror 42 controls the emitting direction of the laser beam, regardless of whether or not the laser scanner 4 is in motion by the robot 1. Furthermore, the laser scanner 4 may not always be moved to follow the welding locus, and hence useless time in a machining operation can be minimized.

According to this embodiment, as hereinabove described, the focus calculation portion 27 is so formed as to determine whether or not the first reference point B1 serving as the reference position of the arbitrarily-shaped welding locus is located in the welding start range A1 of the laser scanner 4, and start determining whether or not the welding point Wk is located in the welding range A2 of the laser scanner 4 if the first reference point B1 is in the welding start range A1. Thus, the focus calculation portion 27 starts determining whether or not the welding point Wk is located in the welding range A2 of the laser scanner 4 when the laser scanner 4 gets so close to the arbitrarily-shaped welding locus that the first reference point B1 enters the welding start range A1 of the laser scanner 4, and hence an unnecessary control operation for determining whether or not the welding point Wk is in the welding range A2 despite the fact that the laser scanner 4 is located a great distance from the arbitrarily-shaped welding locus can be inhibited to reduce the load on the focus calculation portion 27.

According to this embodiment, as hereinabove described, the welding start range A1 (the X-axis diameter and the Y-axis diameter both are 180 mm) of the laser scanner 4 is set to be smaller than the welding range A2 (the X-axis diameter and the Y-axis diameter both are 200 mm) to which a laser beam can be emitted. Thus, the welding start range A1 having an area smaller than that of the welding range A2 can be employed to move the laser scanner 4 until the first reference point B1 previously enters the welding start range A1. Therefore, the welding range A2 having a relatively large area can be employed to reliably capture the plurality of welding points Wk continuously when welding is actually performed, and hence welding corresponding to the arbitrarily-shaped welding locus can be reliably performed.

According to this embodiment, as hereinabove described, the robot system 100 determines whether or not the position $^{L}Wk$ of the welding point is located in the welding range A2 on the basis of the laser scanner coordinate system {L} as viewed from the laser scanner 4 different from the robot coordinate system {R} when determining whether or not the welding point Wk is located in the welding range A2 to which a laser beam can be emitted. At this time, the focus calculation portion 27 transforms the position $^{R}Wk$ of the welding point and the current position $^{R}_{L}T$ of the laser scanner 4 both as viewed from the robot coordinate system {R} into the position $^{L}Wk$ of the welding point and the current position $(^{R}_{L}T)^{-1}$ of the laser scanner 4 both as viewed from the laser scanner coordinate system {L}, and thereafter determines whether or not the position $^{L}Wk$ of the welding point into which the position $^{R}Wk$ of the welding point is transformed is located in the welding range A2. Thus, the robot system 100 can determine whether or not the position $^{L}Wk$ of the welding point is located in the welding range A2 on the basis of the position of the laser scanner 4 in motion, and hence the focus calculation portion 27 can easily perform control processing based on operations of the laser scanner 4.

According to this embodiment, as hereinabove described, the focus calculation portion 27 is so formed as to move the welding range A2 to which a laser beam can be emitted by moving the laser scanner 4 by the robot 1 and sequentially determine whether or not the plurality of welding points Wk are located in the welding range A2. Thus, the laser scanner 4 may not be moved to follow the arbitrarily-shaped welding locus exactly during welding, and hence useless time in a machining operation can be minimized due to the simplified movement of the laser scanner 4.

According to this embodiment, as hereinabove described, the reference direction of the arbitrarily-shaped work locus is defined by the direction from the first reference point B1 toward the second reference point B2 (direction X), and the focus calculation portion 27 is so formed as to move the welding start range A1 of the laser scanner 4 by moving the laser scanner 4 along the reference direction (direction X) by the robot 1 and determine whether or not the first reference point B1 is located in the welding start range A1. Thus, the robot system 100 can reliably determine whether or not to start welding by simply moving the laser scanner 4 along the reference direction previously defined, and hence useless time in a machining operation can be minimized due to the simplified movement of the laser scanner 4.

Although the present invention has been described and illustrated in detail, it is clearly understood that the same is by way of illustration and example only and is not to be taken by way of limitation, the spirit and scope of the present invention being limited only by the terms of the appended claims.

For example, while the robot system performing remote laser welding by emitting a laser beam is shown as an example of the robot system in the present invention in the aforementioned embodiment, the present invention is not restricted to this. The present invention may alternatively be applied to a robot system performing work such as cutting of a target workpiece by a laser beam, for example, other than welding.

While the device slot (acceptance portion) allowing the memory card to be read and the USB terminal (acceptance portion) are provided on the pendant 3 serving as the teaching apparatus in the present invention in the aforementioned embodiment, the present invention is not restricted to this. In the present invention, the acceptance portion may be provided on the robot control apparatus other than the teaching apparatus, for example.

While the device slot allowing the memory card to be read and the USB terminal are shown as examples of the acceptance portion in the present invention in the aforementioned embodiment, the present invention is not restricted to this. In the present invention, an acceptance portion allowing a portable recording medium other than the memory card and the USB memory, for example, to be read may be employed, or an acceptance portion corresponding to connection such as LAN connection (including wired and wireless connection), other than USB connection may be employed. Furthermore, the information regarding the arbitrarily-shaped work locus may be transmitted from the PC (external information terminal) to the pendant (teaching apparatus) or the robot control apparatus through the Internet if the PC (external information terminal) and the pendant (teaching apparatus) or the robot control apparatus can be connected to the Internet. In this case, an Internet connection portion of the pendant (teaching apparatus) or the robot control apparatus functions as the acceptance portion.

While the robot system is formed to be capable of corresponding to the arbitrary shape prepared by combining the three different line types, which are a straight line, a circular arc, and an ellipse in the aforementioned embodiment, the present invention is not restricted to this. In the present invention, the robot system may be formed to be capable of corresponding to an arbitrary shape prepared by combining line types such as a sine curve and a cosine curve, for example, other than a straight line, a circular arc, and an ellipse.

While the PC is shown as an example of the external device in the present invention in the aforementioned embodiment, the present invention is not restricted to this. In the present invention, an external device (external information terminal) such as a portable telephone terminal or a personal digital assistance (PDA), for example, other than the PC may be employed. Furthermore, while the external device and the pendant (teaching apparatus) are provided separately from each other in the aforementioned embodiment, the present invention is not restricted to this, but both may be integrated. In other words, the function of the pendant (teaching apparatus) may be integrated in the PC or the like, which is an external device, and the PC may be connected to the robot control apparatus. Alternatively, the pendant may be formed to be capable of preparing the arbitrarily-shaped welding locus thereon.

While the processing performed by the focus calculation portion serving as the control portion is described with the flow-driven flowchart in which processing is performed in order along the lines of a processing flow for convenience of description in the aforementioned embodiment, the present invention is not restricted to this. In the present invention, the processing performed by the control portion may be event-driven processing performed on a one-event basis. In this case, the processing performed by the control portion may be completely event-driven processing or a combination of event-driven processing and flow-driven processing.

What is claimed is:

1. A robot system comprising:
a robot;
a laser emitting portion moved by said robot, emitting a laser beam to a target workpiece;
a control portion controlling said laser emitting portion to emit said laser beam on the basis of information regarding an arbitrarily-shaped work path and movement information of said laser emitting portion; and
a teaching apparatus to teach an operation of said robot,
wherein said control portion is configured to control said laser emitting portion to emit said laser beam on the basis of said information regarding said arbitrarily-shaped work path prepared with a work path preparation device and said movement information of said laser emitting portion,
wherein said control portion is configured to control said laser emitting portion to emit said laser beam on the basis of said information regarding said arbitrarily-shaped work path prepared with an external device serving as said work path preparation device, different from said teaching apparatus and said movement information of said laser emitting portion,
wherein said teaching apparatus teaches a reference position and a reference direction of said arbitrarily-shaped work path prepared with said external device,
wherein said control portion is configured to acquire information regarding a position to be worked corresponding to said arbitrarily-shaped work path on the basis of said information regarding said arbitrarily-shaped work path and said reference position and said reference direction taught by said teaching apparatus, and control said laser emitting portion to emit said laser beam to acquired said position to be worked, wherein said control portion is configured to determine whether or not a position to be worked corresponding to said arbitrarily-shaped work path is located in a working range to which said laser beam can be emitted from said laser emitting portion regardless of whether or not said laser emitting portion is moving, and control said laser emitting portion to emit said laser beam if said position to be worked is located in said working range, wherein said laser emitting portion is configured to be moved by said robot on the basis of a first coordinate system based on said robot, and wherein said control portion is configured to determine whether or not said position to be worked is located in said working range on the basis of a second coordinate system based on said laser emitting portion different from said first coordinate system regardless of whether or not said laser emitting portion is moving, and control said laser emitting portion to emit said laser beam if said position to be worked is located in said working range.

2. The robot system according to claim 1, wherein said control portion is configured to control said laser emitting portion to emit said laser beam on the basis of said information regarding said arbitrarily-shaped work path prepared with said teaching apparatus serving as said work path preparation device and said movement information of said laser emitting portion.

3. The robot system according to claim 1, further comprising an acceptance portion accepting said information regarding said arbitrarily-shaped work path prepared with said external device, wherein said control portion is configured to control said laser emitting portion to emit said laser beam on the basis of said information regarding said arbitrarily-shaped work path accepted by said acceptance portion and said movement information of said laser emitting portion.

4. The robot system according to claim 3, wherein said acceptance portion includes a recording medium read portion capable of accepting said information regarding said arbitrarily-shaped work path prepared with said external device through a portable recording medium.

5. The robot system according to claim 3, wherein said acceptance portion is provided on said teaching apparatus, and said information regarding said arbitrarily-shaped work path can be acquired through said acceptance portion on the basis of an operation of said teaching apparatus.

6. The robot system according to claim 1, wherein said external device includes an external information terminal.

7. The robot system according to claim 1, wherein a shape of said arbitrarily-shaped work path includes a shape obtained by combining different types of lines.

8. The robot system according to claim 1, wherein, said laser emitting portion includes a mirror member actuatable for emitting said laser beam to said target workpiece while changing a direction of said laser beam, and said control portion is configured to control said laser emitting portion to emit said laser beam to said position to be worked along said arbitrarily-shaped work path while changing said direction of said laser beam by actuating said mirror member regardless of whether or not said laser emitting portion is moving.

9. The robot system according to claim 1, wherein said control portion is configured to determine whether or not a reference position of said arbitrarily-shaped work path is located in a prescribed range of said laser emitting portion when said laser emitting portion is moving, and start determining whether or not said position to be worked is located in said working range if said reference position is in said prescribed range.

10. The robot system according to claim 9, wherein said prescribed range of said laser emitting portion is set to be smaller than said working range to which said laser beam can be emitted.

11. The robot system according to claim 1, wherein said movement information of said laser emitting portion includes information regarding a current position of said laser emitting portion, and said control portion is configured to transform said information regarding said arbitrarily-shaped work path and said information regarding said current position of said laser emitting portion both defined on the basis of said first coordinate system into said information regarding said arbitrarily-shaped work path and said information regarding said current position of said laser emitting portion both defined on the basis of said second coordinate system based on said current position of said laser emitting portion, and thereafter determine whether or not said position to be worked is located in said working range using said information regarding said arbitrarily-shaped work path and said information regarding said current position of said laser emitting portion both defined on the basis of said second coordinate system, and control said laser emitting portion to emit said laser beam if said position to be worked is located in said working range.

12. The robot system according to claim 1, wherein said control portion is configured to move said working range to which said laser beam can be emitted by moving said laser emitting portion by said robot, and determine whether or not said position to be worked is located in said working range.

13. The robot system according to claim 9, wherein said reference position of said arbitrarily-shaped work path includes a first reference point related to a working start position and a second reference point related to a working end position, a reference direction of said arbitrarily-shaped work path is defined by a direction from said first reference point toward said second reference point, and said control portion is configured to move said prescribed range of said laser emitting portion by moving said laser emitting portion along said reference direction by said robot, and determine whether or not said reference position is located in said prescribed range.

14. The robot system according to claim 1, wherein said movement information of said laser emitting portion includes information regarding a current position of said laser emitting portion, said laser emitting portion includes a mirror member actuatable for emitting said laser beam to said target workpiece while changing a direction of said laser beam, and said control portion is configured to control said laser emitting portion to emit said laser beam to a position to be worked along said arbitrarily-shaped work path while changing said direction of said laser beam by actuating said mirror member on the basis of said information regarding said arbitrarily-shaped work path and said information regarding said current position of said laser emitting portion in motion.

15. The robot system according to claim 3, wherein
said acceptance portion is provided on said teaching apparatus,
said external device and said teaching apparatus are formed to be capable of communicating with each other, and
said information regarding said arbitrarily-shaped work path can be transmitted from said external device to said teaching apparatus provided with said acceptance portion to be acquired by said teaching apparatus.

* * * * *